US010191709B2

(12) United States Patent
Seo et al.

(10) Patent No.: US 10,191,709 B2
(45) Date of Patent: Jan. 29, 2019

(54) DISPLAY APPARATUS CONFIGURED TO DETERMINE A PROCESSING MODE TO TRANSFER IMAGE CONTENTS TO ANOTHER DISPLAY APPARATUS

(71) Applicant: SAMSUNG ELECTRONICS CO., LTD., Suwon-si (KR)

(72) Inventors: Seo-ye Seo, Hwaseong-si (KR); Dong-jin Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 199 days.

(21) Appl. No.: 15/238,136

(22) Filed: Aug. 16, 2016

(65) Prior Publication Data

US 2017/0068502 A1 Mar. 9, 2017

(30) Foreign Application Priority Data

Sep. 4, 2015 (KR) .................... 10-2015-0125779
Oct. 16, 2015 (KR) .................... 10-2015-0144719

(51) Int. Cl.
*G06F 3/14* (2006.01)

(52) U.S. Cl.
CPC .......... *G06F 3/1446* (2013.01); *G06F 3/1431* (2013.01); *G09G 2350/00* (2013.01); *G09G 2370/042* (2013.01)

(58) Field of Classification Search
CPC ............... G06F 3/1446; G06F 3/1423; G09G 2300/026; G09G 2354/00; G09G 2350/00
See application file for complete search history.

(56) References Cited

U.S. PATENT DOCUMENTS

| 7,027,058 | B2* | 4/2006 | Tomooka | G06F 3/1446 345/537 |
| 8,933,936 | B2 | 1/2015 | Inada et al. | |
| 2002/0118144 | A1* | 8/2002 | Edmonds | G09G 5/006 345/1.1 |
| 2008/0136348 | A1* | 6/2008 | Varrin | G09F 9/33 315/291 |
| 2009/0182917 | A1* | 7/2009 | Kim | G06F 3/1431 710/106 |
| 2009/0278763 | A1* | 11/2009 | Zeng | G06F 3/1431 345/1.1 |

(Continued)

FOREIGN PATENT DOCUMENTS

KR    10-2011-0044171 A    4/2011
KR       10-1268169 B1    5/2013

(Continued)

*Primary Examiner* — Kent W Chang
*Assistant Examiner* — Nathaniel P Brittingham
(74) *Attorney, Agent, or Firm* — Sughrue Mion, PLLC

(57) ABSTRACT

A display apparatus includes an image inputter configured to perform communication with an external device; and a processor configured to: determine a resolution of image contents received through the image inputter, determine a bandwidth to transmit the received image contents to another display apparatus based on the determined resolution, determine a processing mode to transfer the received image contents to the different display apparatus, and control the image inputter to transmit the image contents processed according to the determined processing mode based on the determined bandwidth to the other display apparatus.

16 Claims, 9 Drawing Sheets

(56) References Cited

U.S. PATENT DOCUMENTS

| | | | |
|---|---|---|---|
| 2011/0182560 A1 | 7/2011 | Kambhatla | |
| 2012/0057517 A1* | 3/2012 | Kambhatla | G06F 3/1423 |
| | | | 370/315 |
| 2014/0267908 A1* | 9/2014 | Hagenbuch | G09G 5/14 |
| | | | 348/552 |
| 2015/0054755 A1 | 2/2015 | Kambhatla | |
| 2015/0340009 A1* | 11/2015 | Loeffler | G06F 3/1438 |
| | | | 345/1.3 |
| 2017/0068502 A1* | 3/2017 | Seo | G06F 3/1446 |
| 2017/0316754 A1* | 11/2017 | Katougi | G09G 5/06 |

FOREIGN PATENT DOCUMENTS

| | | |
|---|---|---|
| KR | 10-1394796 B1 | 5/2014 |
| KR | 10-2015-0024777 A | 3/2015 |

* cited by examiner

DISPLAY APPARATUS CONFIGURED TO DETERMINE A PROCESSING MODE TO TRANSFER IMAGE CONTENTS TO ANOTHER DISPLAY APPARATUS

CROSS-REFERENCE TO RELATED APPLICATIONS

This application claims priority from Korean Patent Application No. 10-2015-0144719, filed in the Korean Intellectual Property Office on Oct. 16, 2015, and 10-2015-0125779 filed on Sep. 4, 2015, the disclosures of which are incorporated herein by reference in their entireties.

BACKGROUND

1. Field

Apparatuses and methods consistent with exemplary embodiments relate to a display apparatus and a controlling method thereof, and more particularly, to a display apparatus that minimizes signal loss of the image contents received from an external device in a display system such as a video wall composed of a plurality of display apparatuses, and more rapidly transmits the contents to another display apparatus, and a controlling method thereof.

2. Description of the Related Art

Recently, a display system such as a video wall including a large format display (LFD) such as full-high definition (FHD) resolution or ultra-high definition (UHD) display apparatus has been used to utilize display apparatuses for hospitals, reception venues of companies, or large-scaled screen advertisement, and the like.

LFD, using several panels, may realize visual effect as if various media move as one, by assembling a video wall in various types. A video wall is composed of a plurality of digital displays so that one big image or many images can be displayed. In this case, the display apparatus may receive high resolution image contents such as FHD and UHD from an external source device and transmit the contents to a plurality of different display apparatuses. For high speed transmission of the image, due to signal loss of the image contents transmitted from a display apparatus to another display apparatus, there may be error in operation of a display apparatus such as distortion of image on a screen.

In the related art, when implementing the LFD video wall to display FHD and UHD image contents, display interface such as Display Port 1.2 (DP 1.2) is used. DP 1.2 prevents erroneous operation of the display apparatus due to signal loss in the process of transmitting image contents from a display apparatus to another display apparatus, or from an external source device to a display apparatus.

However, when resolution input to the display apparatus is UHD, the display apparatus implemented as DP 1.2 recognizes UHD resolution to four divided FHD data. Therefore, there is a problem that the display apparatus implemented with DP1.2 may not recognize UHD original data when receiving UHD image contents from an external source device.

Further, the display apparatus reduces bandwidth during a process of recognizing input UHD image contents as FHD. In this case, in order to transmit UHD image contents from a display apparatus to another display apparatus, bit rate (high bit rate) applicable for UHD has been input manually.

Therefore, there may be a use for a method for minimizing signal loss of original data of UHD image contents and transmitting the UHD contents to another display apparatus rapidly, when reading original data of UHD image where the display apparatus is input and configuring a video wall transmitting the data to another display apparatus.

SUMMARY

Exemplary embodiments may address at least the above problems and/or disadvantages and other disadvantages not described above. Also, the exemplary embodiments are not required to overcome the disadvantages described above, and may not overcome any of the problems described above.

An aspect of one or more exemplary embodiments relates to a display apparatus that rapidly transmits high resolution image contents received by a display apparatus from an external apparatus to another display apparatus, by minimizing signal loss of the image contents.

According to an aspect of an exemplary embodiment, there is provided a display apparatus including: an image inputter configured to perform communication; and a processor configured to: determine a resolution of image contents received through the image inputter; determine a bandwidth to transmit the received image contents to another display apparatus based on the determined resolution; determine a processing mode to transfer the received image contents to the other display apparatus; and control the image inputter to transmit the image contents processed according to the determined processing mode based on the determined bandwidth to the other display apparatus.

The display apparatus may include an image processor configured to process the received image contents; and a display configured to display at least a part of the processed image contents, wherein the processing mode may include a bypass mode, which transfers the received image contents to the other display apparatus without parsing, and a repackaging mode, which reconstructs the processed image contents and transmits to the other display apparatus.

The determining the processing mode may include determining one among the bypass mode and the repackaging mode, based on an arrangement order of the display apparatus.

The repackaging mode may operate in a preset arrangement order of the display apparatus and the other display apparatus.

The processor may be further configured to determine a signal loss rate of the processed image contents and determine one among the bypass mode and the repackaging mode according to the signal loss rate.

The processor may be further configured to, in response to the signal loss rate being greater than or equal to a preset value, determine the processing mode as the repackaging mode, and in response to the signal loss rate being less than a preset value, determine the processing mode as the bypass mode.

The processor may be further configured to, in response to the resolution of the received image contents being a first resolution, determine the bandwidth as a first bit rate, and in response to the resolution of the received image contents being a second resolution, determine the bandwidth as a second bit rate.

The image inputter may include a display interface configured to transmit the processed image contents to the other display, and the display interface may include a receiving terminal and a transmitting terminal.

The display apparatus and the other display apparatus may be included in a video wall that displays the processed image contents.

According to an aspect of another exemplary embodiment, there is provided a method of controlling a display apparatus, the method including: receiving image contents; determining a resolution of the received image contents; determining a bandwidth to transmit the received image contents to another display apparatus, and determining a processing mode to transmit the received image contents to the other display apparatus; and transmitting the image contents processed according to the determined processing mode based on the determined bandwidth to the other display apparatus.

The method may include image-processing the received image contents; and displaying at least a part of the processed image contents, wherein the processing mode may include a bypass mode, which transfers the received image contents to the other display apparatus without parsing, and a repackaging mode, which reconstructs the processed image contents and transmits to the other display apparatus.

The determining the processing mode may include determining one among the bypass mode and the repackaging mode, based on an arrangement order of the display apparatus.

The repackaging mode may operate in a preset arrangement order of the display apparatus and the other display apparatus.

The method may include determining a signal loss rate of the processed image contents, wherein the determining the processing mode may include determining one among the bypass mode and the repackaging mode according to the signal loss rate of the processed image contents.

The determining the processing mode may include, in response to the signal loss rate being greater than or equal to a preset value, determining the processing mode as the repackaging mode, and in response to the signal loss rate being less than a preset value, determining the processing mode as the bypass mode.

The determining the bandwidth may include, in response to the resolution of the received image contents being a first resolution, determining the bandwidth as a first bit rate, and in response to the resolution of the received image contents being a second resolution, determining the bandwidth as a second bit rate.

The receiving may include receiving the processed image contents through a display interface for transmitting the contents to the other display, and the display interface may include a receiving terminal and a transmitting terminal.

The display apparatus and the other display apparatus may be included in a video wall that displays the processed image contents.

According to the aforementioned exemplary embodiments, the display apparatus included in a video wall may minimize signal loss of the image contents and may transmit to a different display apparatus at high speed.

BRIEF DESCRIPTION OF THE DRAWINGS

The above and/or other aspects of one or more exemplary embodiments will be more apparent by describing the exemplary embodiments with reference to the accompanying drawings, in which.

DETAILED DESCRIPTION

Figure 1:
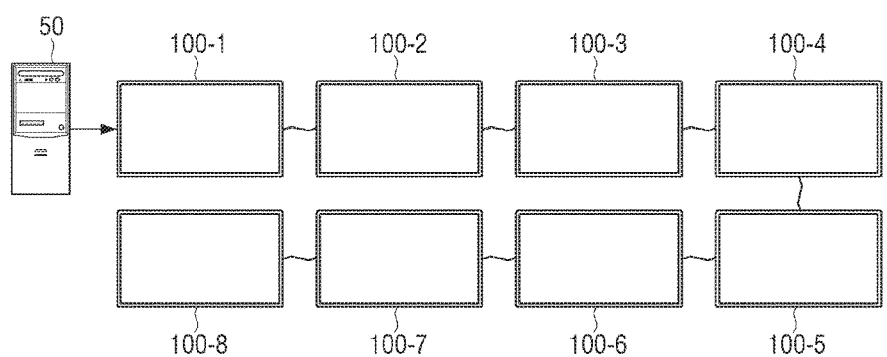
FIG. 1 is a view illustrating a display system according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of one or more exemplary embodiments. Thus, it is apparent that one or more exemplary embodiments can be carried out without those specifically defined matters. Also, well-known functions or constructions may not be described in detail if they would obscure the disclosure with unnecessary detail.

It will be understood that the terms such as "unit," "-er (-or)," and "module" described in the specification refer to an element for performing at least one function or operation, and may be implemented in hardware, software, or the combination of hardware and software.

Expressions such as "at least one of," when preceding a list of elements, modify the entire list of elements and do not modify the individual elements of the list.

FIG. 1 is a view illustrating a display system according to an exemplary embodiment. As illustrated in FIG. 1, the display system 10, while a plurality of the display apparatuses 100-1 to 100-8 are connected, displays high resolution image contents received from the external source device 50 on each of the display apparatus 100-1 to 100-8. In this closure, the image contents indicate various images including moving images such as 2D and 3D images and videos.

At this time, the external source device 50 may be implemented as electronic devices such as computer, a host device or other display apparatuses 100-1 to 100-8. In addition, the display system 10 may be implemented as a Large Format Display video wall (LFD video wall) where a plurality of Full High Definition (FHD) and Ultra High Definition (UHD) display apparatuses 100 are connected in a loop out format. However, the aforementioned example is merely an example and it can be implemented as various display systems which display one image using a plurality of display apparatus 100. Herein, loop out format indicates that each of the plurality of devices which are interconnected within a video wall may transmit data to another display apparatus, and receive data from another display apparatus.

In this case, the plurality of display apparatus 100-1 to 100-8, in order to display each of high resolution image contents (FHD or UHD) on the display apparatus 100 with high speed, requires that signal of data of image to be transmitted is not lost. If each of the signal data received by the plurality of display apparatuses 100-1 to 100-8 is significantly different, a viewer viewing the display system 10 may view a distorted image. Therefore, in order for values of each signal input to the plurality of the display apparatus 100-1 to 100-8 to be less distorted or lost, it may be necessary that the plurality of the display apparatus 100-1 to 100-8 control each of the image contents.

According to an exemplary embodiment, the display apparatus 100 may determine resolution of the image contents (FHD and UHD) input by the external source device 50, and determine bandwidth to transmit the input image contents to another display apparatus 100 based on the determined resolution. When the resolution of the image contents received by the display apparatus 100 from the external source device 50 is the first resolution, bandwidth can be determined as the first bit rate (High Bit Rate1, HBR1). In the meantime, when resolution of the image contents received by the display apparatus 100 from the external source device 50 is the second resolution, the bandwidth may be determined as the second bit rate (High Bit Rate2, HBR2).

In addition, a processing mode to process the image contents display apparatus 100 receives from external source device 50 to display apparatus 100-1 to 100-8 can be determined. The processing mode may be a bypass mode or repackaging mode. The bypass mode is a mode that the first display apparatus 100-1 passes through the image contents input from the external source device 50 to the second display apparatus 100-2 without parsing to reduce on time. In the meantime, the repackaging mode is a mode to reconstruct and transmit image contents, when the first display apparatus 100-1 transmit the input image contents to the second display apparatus 100-2 with the determined bitrate. The repackaging mode, in comparison with bypass mode has an advantage of restoring lost signal, although on time is long.

The processing mode of the display apparatus 100 may determine one of the bypass mode and the repackaging mode based on the arrangement position of the display apparatus 100 on a video wall composed with matrix of a plurality of the display apparatus 100-1 to 100-8.

The repackaging mode can be determined to regularly operate in a preset order from among the display apparatus 100-1 to 10-8 so that signal loss of the image processed in the display apparatus 100 is prevented or lost signal is reconstructed.

In addition, regardless arrangement order in the video wall of the display apparatus 100, according to signal loss rate of the image contents processed by the display apparatus 100, the bypass mode or the repackaging mode can be determined. In other words, when signal loss rate of the image contents processed by the first display apparatus 100-1 is greater than or equal to a preset value, the processing mode can be the repackaging mode which reconstructs signal loss of the processed image and transmit to the second display apparatus 100-2. In the meantime, when the signal loss rate of the image contents processed by the first display apparatus 100-1 is less than a preset value, the processing mode can be a bypass mode which passes through the processed image to the second display apparatus 100-2 without parsing the image.

Referring to FIG. 1, the first display apparatus 100-1 receives high resolution image from the external source device 50, and determines resolution (for example, FHD or UHD) of input image contents. The first display apparatus 100-1, based on the determined resolution, may determine bandwidth to transmit the contents received from the external source device 50 to the second display apparatus 100-2 based on the determined resolution. In addition, the first display apparatus 100-1 may determine a processing mode to transmit the image contents received from the external source device 50 to transmit to the second display apparatus 100-2, and transmit the processed image contents to the second display apparatus 100-2 based on the determined bandwidth.

In addition, the second display apparatus 100-2 receives image contents processed by the first display apparatus 100-1. The second display apparatus 100-2 determines resolution of an image received from the first display apparatus 100-1. The second display apparatus 100-2, based on the determined resolution, determines bandwidth to transmit the image contents received from the first display apparatus 100-1 to the third display 100-3. In addition, the second display apparatus 100-2 determines a processing mode to transmit the image contents received from the first display apparatus 100-1 to the third display apparatus 100-3 and transmit the image contents processed according to a determined processing mode based on the determined bandwidth to the third display apparatus 100-3.

Therefore, according to one or more exemplary embodiments, a plurality of display apparatuses 100-1 to 100-8 composing a video wall receive high resolution image respectively from external source device 50 or another display apparatus 100-1 to 100-8, and determine resolution of the input image. Each of the display apparatus 100-1 to 100-8 determines bandwidth to transmit each of the received image to display apparatuses 100-1 to 100-8, and based on the determined bandwidth, transmits the image contents processed according to a processing mode determined in each of the display apparatus 100-1 to 100-8 to the display apparatuses 100-1 to 100-8.

According to the exemplary embodiments, the display apparatus 100 included in a video wall may minimize signal loss of the image contents received from an external source device 50 and transmit the received image contents to display apparatuses 100-1 to 100-8 at high speed.

Figure 2:
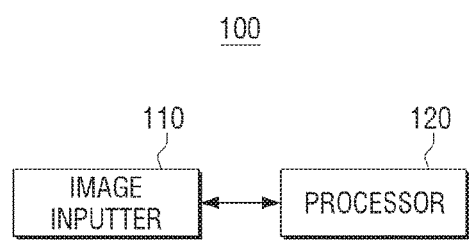
FIG. 2 is a block diagram illustrating a configuration of the display apparatus according to an exemplary embodiment.

FIG. 2 is a block diagram briefly illustrating the configuration of the display apparatus 100 according to an exemplary embodiment. As FIG. 2, the display apparatus 100 includes an image inputter 110 and the processor 120.

The image inputter 110 performs communication with the external source device 50. In particular, the image inputter 110 may receive image contents from the external source device 50. In this case, an external source device may be implemented as computer, a host device or another display apparatus.

In addition, the image inputter 110 may include display interface for transmitting the image contents which are processed by receiving image from the external source device 50 by the first display apparatus 100-1 to the second display apparatus 100-2, and the display interface may include receiving (Rx) terminal and transmitting (Tx) terminal.

The processor 120 controls overall functions to process image contents input from the external source device 50 by the display apparatus 100. In particular, processor 120 determines resolution of the image contents input from external source device 50. In addition, processor 120 determines bandwidth to transmit image processed based on a resolution of the image determined by the display apparatus 100 to different display apparatuses 100-1 to 100-8.

In addition, processor 120 determines a processing mode to minimize loss of signal of image contents processed based on bandwidth which the display apparatus 100 determines. The processor 120 may determine at least one of the bypass mode and the repackaging mode. The bypass mode is a mode which passes through the image contents which the first display apparatus 100-1 receives from the external source device 50 to the second display apparatus 100-2 without parsing the image contents. The repackaging mode is a mode to reconstruct the image which the first display apparatus 100-1 receives from the external source device 50 and transmits to the second display apparatus 100-2.

In addition, the processor 120 may determine one of the bypass mode and the repackaging mode on a video wall where a plurality of the display apparatuses 100 are configured in a matrix, based on an arrangement position of the display apparatus 100. In this case, the processor 120 may be configured to regularly determine a repackaging mode in the display apparatus 100 disposed in a specific position.

In addition, the processor 120 may determine signal loss ratio of the image contents processed by the display apparatus 100, and determine one of the bypass mode and the repackaging mode according to the determined signal loss rate. That is, processor 120, when the signal loss rate of the image processed by the display apparatus 100 is greater than or equal to a preset value, may be configured to determine a processing mode of the display apparatus 100 to be a repackaging mode. When the signal loss rate processed by the display apparatus 100 is less than a preset value, the processor 120 may determine a processing mode of the display apparatus 100 to the bypass mode.

Figure 3:
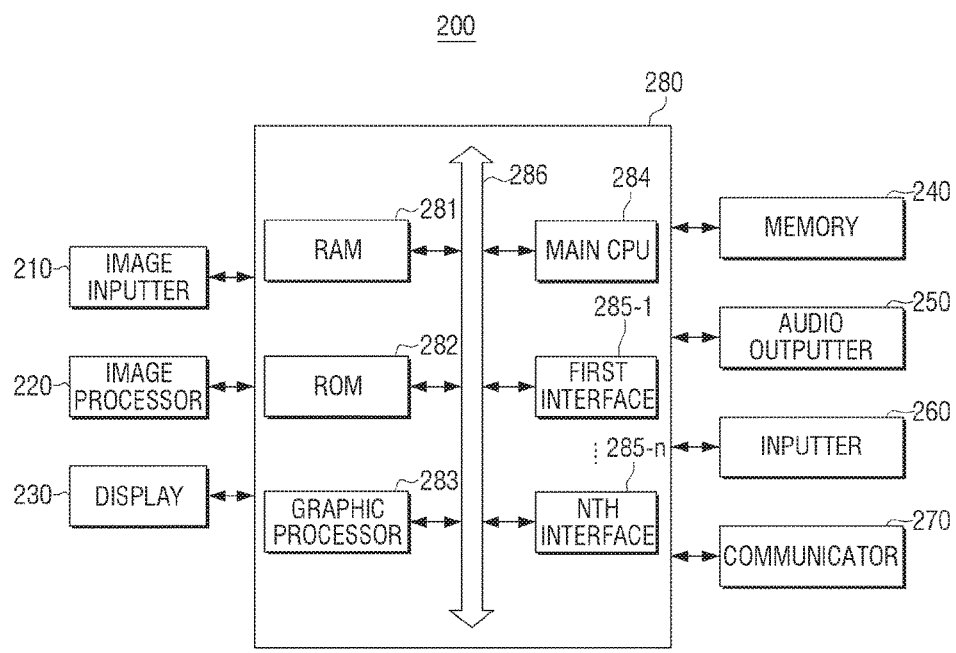
FIG. 3 is a block diagram illustrating a configuration of the display apparatus according to an exemplary embodiment.

FIG. 3 is a block diagram which illustrates the configuration of the display apparatus 200 in a greater detail according to an exemplary embodiment. As illustrated in FIG. 3, the display apparatus 200 includes an image inputter 210, an image processor 220, a display 230, memory 240, an audio outputter 250, an inputter 260, a communicator 270, and a processor 280.

The image inputter 210 performs communication with various types of external devices according to various types of communication methods. In particular, according to an exemplary embodiment, the image inputter 210, from the external source device 50, may transceive high resolution image contents such as FHD or UHD to the display apparatus 100. In addition, the image inputter 210 may transceive the image contents processed through the processor 120 by the first display apparatus 100-1 to the second display apparatus 100-2.

In addition, the image inputter 210 may include the display interface to transmit the image contents which are received by the first display apparatus 100-1 from the external source device 50 to the second display apparatus 100-2, and the display interface may receive receiving (Rx) terminal and transmitting (Tx) terminal.

According to an exemplary embodiment, the image inputter 210 may include digital display interface including receiving terminal (Rx) and transmitting terminal (Tx) such as DP1.2 (display port) which supports transmission of stream of high resolution image. DP1.2 is merely an exemplary embodiment, and can be deformed and implemented through various display interface which supports stream transmission of high resolution image.

The image processor 220 is an element which performs image processing with respect to the image data obtained from the image inputter 210. The image processor 220 may perform various image processing such as decoding, scaling, noise filtering, frame rate conversion, resolution conversion with respect to image data. In particular, the image processor 220 may process the image contents processed through the processor 120.

The display 230 displays at least one of the image contents processed through the processor 120 and received from the image inputter 210 and various UI processed from the graphic processor 283. In particular, the display 230 displays at least one of the image contents processed by the processor 120.

In particular, when the display apparatus 200 is implemented as one configuration from among video wall, the display 230 may display a part of the input image contents.

The memory 240 stores various modules to operate the display apparatus 200. For example, in the memory 240, software including a base module, a sensing module, a communication module, a presentation module, a web browser module, and a service module can be stored. In this case, the base module is basic module which processes signal delivered from each hardware included in the display apparatus 200 to an upper layer module. The sensing module is a module which collects information from each sensor, analyze and manage collected information, and may include face recognition module, voice recognition module, motion recognition module, and NFC recognition module. The presentation module is a module to configure a display screen and may include a multimedia module to reproduce and output multimedia contents, and a UI rendering module which performs UI and graphic processing. The communication module is a module to perform communication with external device (outside). The web browser module means a module to perform web browsing and access to a web server. The service module is a module including various applications to provide various services.

In particular, the memory 240, when the first display apparatus 100-1 transmits the image contents received from the external source device 50 to the second display apparatus 100-2, may store modules which perform a function to maintain on time speed as much as rapid, the on time speed for minimizing signal loss of data and processing of image. The memory 240 may store a receiving module, a resolution determination module, and a module for determining bandwidth and processing mode determination.

The receiving module determines input of image from the external source device 50 to the display apparatus 100. In addition, the resolution determination module determines whether resolution input by the display apparatus 100 from the external source device 50 is FHD or UHD. In addition, the bandwidth determination and processing mode determination module determines bandwidth to transmit the image received based on the resolution which the first display apparatus 100-1 receives from the external source device 50 to the second display apparatus 100-2, and determines at least one processing mode between bypass mode or repackaging mode based on the determined bandwidth.

In this case, the processing mode may be a bypass mode that the first display apparatus 100-1 does not parse the image contents received from the external source device 50, and passes through the second display apparatus 100-2, and a repackaging mode that the first display apparatus 100-1 reconstructs the processed image contents and transmits to the second display apparatus 100-2.

As described above, the memory 240 may include various program modules, but various program module can be omitted, changed, or added according to the types and features of the display apparatus 200. For example, when the above display apparatus 200 is implemented as tablet PC, the base module may further include a position determination module to determine a position based on GPS, and a sensing module may include a sensing module which senses a user's operation.

The audio outputter 250 is a configuration which outputs not only various audio data processed by the audio processor but also outputs various notification sound or voice message.

The inputter 260 receives various user operation to control the display apparatus 200. In the meantime, the inputter 280 may be implemented as various input devices such as a remote controller, voice inputter, motion inputter, and pointing device.

The communicator 270 may include various communication chips such as Wi-Fi chip, Bluetooth chip, NFC chip, and communication chip. In this case, the Wi-Fi chip, Bluetooth chip, and NFC chip perform communication using LAN method, Wi-Fi method, Bluetooth method, and NFC method. From the above, the NFC chip indicates a chip which operates in near field communication (NFC) using 13.56 MHz band from among various frequency bandwidth of RF-ID frequency such as 135 kHz, 13.56 MHz, 433 MHz, 860~960 MHz, 2.45 GHz. When using Wi-Fi chip or Bluetooth chip, after transceiving various connection information such as SSID and a session key, communication can be connected and various information can be transceived. Wireless communication chip indicates a chip which performs communication according to various communication specifications such as IEEE, Zigbee, 3G (3rd Generation), 3GPP (3rd Generation Partnership Project), LTE (Long Term Evolution).

The processor 280 controls overall operations of the display apparatus 200 using various programs stored in the memory 240. The processor 280, as illustrated in FIG. 3, includes RAM 281, ROM 282, graphic processor 283, main CPU 284, first to nth interface 285-1~285-n, and Bus 286. In this case, the RAM 281, ROM 282, graphic processor 283, main CPU 284, and the first to nth interface 285-1~285-n can be interconnected using the Bus 286.

The ROM 282 stores command sets for booting system. When a turn-on command is input and power is supplied, the main CPU 284 copies O/S stored in the memory 240 to the RAM 281 according to a command stored in the ROM 282 and executes O/S to boot system. When booting is completed, the main CPU 284 copies various application programs stored in the memory 240 to the RAM 281 and executes application program copied to the RAM 281 to perform various operations.

The graphic processor 283 generates a screen including various objects such as a pointer, icon, image, and text by using a calculator and a renderer. The calculator calculates attribute values such as a coordinate value, shape, size, and color of each object according to layout of a screen by using a control command received from the inputter. The renderer generates a screen of various layouts including an object based on an attribute value calculated by the calculator. The screen generated from the renderer is displayed within a display area of the display 230.

The main CPU 284, by accessing the memory 240, performs booting by using O/S stored in the memory 240. The main CPU 284 performs various operations using various programs, contents, and data stored in the memory 240.

The first to nth interface 285-1 to 285-n are connected with the above elements. One of the interfaces can be network interface connected with an external device through network.

In particular, the processor 280, when the first display apparatus 100-1 transmits the image contents received from the external source device 50 to the second display apparatus 100-2, minimizes signal loss of the transmitted image and performs a function to maintain on time speed of the apparatus 100 as rapid as possible.

The processor 280 determines resolution of the image received from the external source device 50 by the first display apparatus 100-1. In addition, the processor 120, based on the resolution of the image received by the first display apparatus 100-1, determines bandwidth to transmit the image processed by the first display apparatus 100-1 to the second display apparatus 100-2.

In addition, the processor 280 determines one of the bypass mode or the repackaging mode to process image contents based on bandwidth determined from the first display apparatus 100-1. In addition, the processor 120, according to bandwidth determined by the first display apparatus 100-1, controls the image inputter 210 to transmit the processed image contents to the second display apparatus 100-2.

According to an exemplary embodiment, the processor 280 determines whether the resolution of the image contents received from the external source device 50 is FHD or UHD. In this case, when the display apparatus 100 receives high resolution image contents from the external source device 50, the processor 280 may automatically recognize resolution of the original the image contents of FHD or UHD.

In other words, when the first display apparatus 100-1 receives image contents with the resolution of UHD from the external source device 50, the processor 280 may recognize the input UHD data as 4 FHD resolution images are input, and recognize that original data with UHD resolution has been input without reducing bandwidth.

In addition, the processor 280, based on the resolution determined by the first display apparatus 100-1, determines bandwidth to transmit data processed by the first display apparatus 100-1 to the second display apparatus 100-2. When the image contents of FHD resolution are input to the first display apparatus 100-1, the processor 280 determines bandwidth as the first bit rate (HBR1). When image contents of UHD resolution are input to the first display apparatus 100-1, the processor 280 determines bandwidth as the second bit rate (HBR2).

According to an exemplary embodiment, when a plurality of the display apparatuses 100 configures the LFD video wall using display port 1.2 (DP1. ) which supports transmission of high resolution image, DP1.2 provides the image contents processed by the first display apparatus 100-1 with three cases (1 lane, 2 lane, 4 lane) to transmit to the second display apparatus 100-2. In this case, the bit rate of each lane is different according to resolution of image contents input to the display apparatus 100.

In other words, when the first display apparatus 100-1 receives FHD image contents from the external source device 50, DP1.2 provides 2.7 giga bit/second (2.7 Gbit/s) per lane. In this case, the processor 280, as the bandwidth to transmit the FHD image input to the first display apparatus 100-1 to the second display apparatus 100-2, may determine 2.7 Gbit/second per lane of DP1.2 as the first bit rate (HBR1).

In the meantime, when the first display apparatus 100-1 receives UHD image contents from the external source device 50, DP1.2 provides 5.4 Gbit/s per lane. In this case, the processor 280 may determine, as the bandwidth to transmit the UHD image input to the first display apparatus 100-1 to the second display apparatus 100-2, 5.4 Gbit/s as the second bit rate (HBR2) of DP1.2.

According to an exemplary embodiment, when the first display apparatus 100-1 receives image contents with higher resolution than UHD from the external source device 50, the processor 280 may transmit the image processed from the first display apparatus 100-1 to the second display apparatus 100-2 while maintaining original resolution of the image contents input to the first display apparatus 100-1.

For example, DP1.3 (Display Port 1.3), for transmitting image with higher resolution than the UHD, provides the third bit rate (high bit rate 3, HBR3) which is 8.1 Gbit/s per lane. Therefore, when the first display apparatus 100-1 receives image with UHD or higher resolution from the external source device 50, the processor 280 may determine bandwidth to transmit the image data processed by the first display apparatus 100-1 to transmit to the second display apparatus 100-2 as the third bit rate (high bit rate 3, HBR3) having 8.1 Gbit/s.

In addition, the processor 280 may determine a processing mode to transmit the image contents received from the external source device 50 based on bandwidth determined by the display apparatus 100 to the display apparatus 100-1 to 100-8. The processing mode is one of the bypass mode or the repackaging mode.

The bypass mode is a mode that the first display apparatus 100-1 passes through the image contents input from the external source device 50 to the second display apparatus 100-2 without parsing to reduce on time. In the meantime, the repackaging mode is a mode to reconstruct and transmit image contents, when the first display apparatus 100-1 transmit the input image contents to the second display apparatus 100-2 with the determined bitrate.

In this case, the bypass mode has short on time and thus it has an advantage that the display apparatus 100 can rapidly transmit the image data received from the external source device 50 to different display apparatuses 100-1 to 100-8 rapidly. In the meantime, in case of the repackaging mode, on time is longer than bypass in the position of reconstructing signal. However, repackaging mode may reconstruct image data received from the external device 50 by the display apparatus 10 and minimize signal loss of the image contents, and transmit to display apparatuses 100-1 to 100-8.

Therefore, when transmitting high resolution image contents from a video wall consisting a plurality of the display apparatus 100, a bypass mode can be variably combined with the repackaging mode to minimize signal loss, image contents can be transmitted at high speed, so that image contents can be displayed on a video wall.

For example, on a video wall which is implemented as display port (DP1.2) which supports stream transmission of high resolution image, DP1.2 transmits the image contents received by the first display apparatus 100-1 from the external source device 50 to the second display apparatus 100-2 as a packet type. Therefore, when there is intermittent data corruption (signal loss) in data received by the display apparatus 100 from the external source device 50, the first display apparatus 100-1 may reconstruct lost data by processing image data received in the repackaging mode and repack the reconstructed data to transmit to the second display apparatus 100-2.

According to an exemplary embodiment, the first display apparatus 100-1 may receive various source signals from the external source device 50 through digital interface such as High-Definition Multimedia Interface (HDMI) and Digital Visual Interface (DVI), not only DP 1.2 (display port 1.2). In this case, the repackaging mode according to an exemplary embodiment, even if the first display apparatus 100-1 receives various source signals from the external source device 50 through various digital interface, may output DP1.2 signal where the first display apparatus 100-1 has Display Port Configuration Data (DPCD) and transmit to the second display apparatus 100-2.

The AUX channel (AUX CH) composing DP 1.2 may manage link service between the source device 50 and the sink device 100-1 connected by DP 01.2. In this case, the link service is used for detecting, configuring, and maintaining the link between the source device 50 and the sink device 100-1 connected through DP1.2. The AUX channel can read and record access to DPCD for using link services.

Herein, the DPCD indicates data mapped to display port address area of the sink device 100-1 to which DP1.2 is connected. The source device 50 connected to DP1.2 may read state of display port link and state of the sink device 100-1 from DPCD address.

Therefore, according to an exemplary embodiment, even when the first device 100-1 receives a signal through various digital interface, the first device 100-1 may be configured to output DP1.2 signal with DPCD to the second device 100-2. Accordingly, when the first device 100-2 transmits the image contents received from the external source device 50 to the second device 100-2 through another digital interface other than DP1.2, the second device 100-2 may improve processing speed of the image contents in a video wall, as there is no need to convert digital interface signal such as HDMI and DVI to DP1.2 signal.

As described above, in case of the bypass mode, the speed that the first display apparatus 100-1 processes the image contents received from the external source device 50 to transmit to the second display apparatus 100-2 is rapid. However, when processing image contents received from the plurality of the display apparatus 100-1 to 100-8 using bypass mode, due to accumulated signal loss, distortion of image can occur in the display apparatus 100-n at a certain position (n=1, 2, 3, . . . , n).

Therefore, the processor 280, in order to prevent the aforementioned problem, may be configured to determine a repackaging mode in the display apparatus (100-n) disposed in a predetermined arrangement on a video wall where a plurality of the display apparatuses 100-1 to 100-8 are configured as a matrix.

In addition, the processor 280, regardless of arrangement of position of the plurality of the display apparatuses 100-1 to 100-8, may determine signal loss rate of the image contents received by the display apparatus 100 from the external source device 50, and if the signal loss rate of the image processed by the display apparatus 100 is greater than a preset value, may determine a repackaging mode. In the meantime, the processor 280, when signal loss rate of the image processed by the display apparatus 100 is less than a preset value, may be configured to determine bypass mode.

For example, while the image contents received by the first display apparatus 100-1 from the external source device 50 are being changed to a packet type of DP1.2 of the first display apparatus 100-1, there may be signal loss regardless of resolution input to the first display apparatus 100-1. In this case, the processor 280 may determine signal loss rate of the image data occurring in the first display apparatus 100-1, and if the signal loss rate of the image processed by the first display apparatus 100 is greater than or equal to a preset value, may proceed data with the repackaging mode to reconstruct the lost data.

In addition, the processor 280, in order to reduce on time from the second display apparatus 100-2, may proceed data with bypass mode that the second display apparatus 100-2 receives image contents and passes through to the third display apparatus 100-3 without parsing.

Figure 4A:
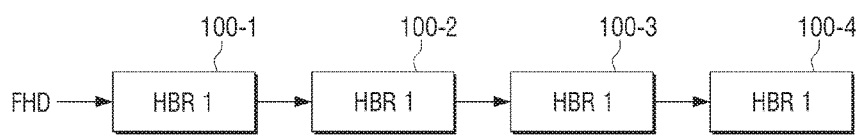
FIGS. 4A to 4B are views illustrating a method for determining bandwidth according to input resolution according to one or more exemplary embodiments.
Figure 4B:
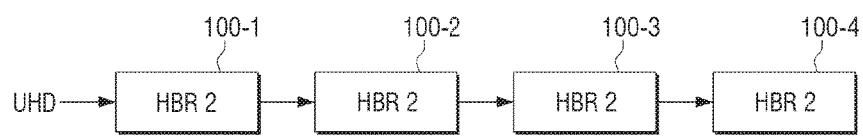

FIGS. 4A and 4B are views to describe a method of determining bandwidth of input image according to resolution in order to transmit the image input to the display apparatus 100-1 to 100-4 from the external source device 50 to another display apparatus.

The first display apparatus 100-1 determines resolution of image contents input from the external source device 50. The first display apparatus 100-1 determines bit rate to transmit the image contents to the second display apparatus 100-2 based on the determined resolution. When the resolution of the image input to the first display apparatus 100-1 from the external source device 50 is FHD, the first display apparatus 100-1 determines the first bit rate, and if resolution of the input image is UHD, the first display apparatus 100-1 determines the second bit rate.

With reference to FIG. 4A, when the first display 100-1 receives FHD resolution image from the external source device 50, the first display apparatus 100-1 to the fourth display apparatus 100-4 transmit the image contents processed in the display apparatus 100-1 to 100-4 to different display apparatus 100-1 to 100-4 at the first bit rate (HBR1).

In the meantime, as illustrated in FIG. 4B, when the first display apparatus 100-1 receives image contents of UHD resolution from the external source device 50, each of the first display apparatus 100-1 to the fourth display apparatus 100-4 transmit image processed by the display apparatus 100-1 to 100-4 with the second bit rate(HBR2).

However, the above examples are merely exemplary, and can be modified according to input resolution. For example, when the first display 100-1 to the second display 100-2 receives FHD from an external device, each of the display apparatus 100-1 to 100-2 may transmit with the first bit rate (HBR1). In addition, when the third display 100-3 receives UHD data, the bit rate value in the third display 100-3 may be the second bit rate (HBR2).

Figure 5A:
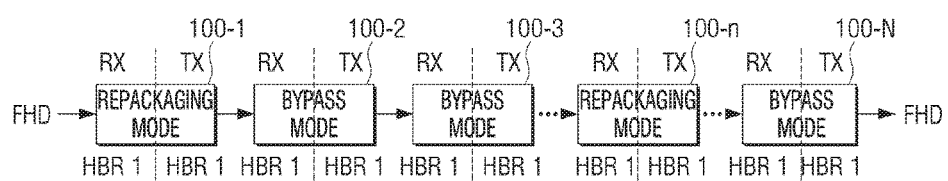
FIGS. 5A to 5B are views illustrating a method for processing image contents according to input resolution according to an exemplary embodiment.
Figure 5B:
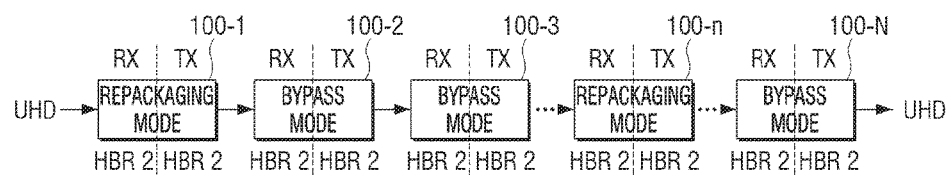

According to an exemplary embodiment, referring to FIGS. 5A and 5B, based on bandwidth determined based on resolution input to the display apparatus 100, a method of determining a processing mode to transmit the image processed by the display apparatus 100 to different display apparatuses 100-1 to 100-4 is described.

The first display apparatus 100-1 may determine a processing mode to process image contents according to bandwidth determined based on resolution of the image input from the external source device 50. The processing mode is one of the bypass mode or the repackaging mode.

The bypass mode is a mode that the first display apparatus 100-1 passes through the image contents input from the external source device 50 to the second display apparatus 100-2 without parsing to reduce on time. In the meantime, the repackaging mode is a mode to reconstruct and transmit image contents, when the first display apparatus 100-1 transmit the input image contents to the second display apparatus 100-2 with the determined bitrate.

In this case, bypass mode has an advantage that on time of the display apparatus 100 is short and thus, data can be delivered rapidly. In the meantime, in case of the repackaging mode, in the process of reconstructing signal loss of the image contents processed by the display apparatus 100, on time of the display apparatus 100 is longer than bypass, but construction of processed data can be done to minimize signal loss.

In addition, according to an exemplary embodiment, for example, it can be implemented that, in a video wall which is implemented through DP 1.2, the repackaging mode can be implemented such that the display apparatus 100 outputs DP1.2 having DPCD, transmits the signal to the display apparatus to enhance data processing speed.

Therefore, in a video wall where a plurality of the display apparatuses 100 are composed with matrix, when the display apparatus 100 transmits high resolution image contents received from external source device 50 to another display, the bypass mode and the repackaging mode can be combined in a variable manner to minimize signal loss and transmit image contents at high speed, and display image contents on a video wall.

In this case, by periodically determining the repackaging mode at a preset position of the display apparatus 100 and reconstructing lost signal, processed image can be transmitted to another display apparatus 100-1 to 100-4.

In addition, a plurality of display apparatus 100 may determine signal loss rate of the image contents received from the external source device 50, and regardless of arrangement of position, may determine a processing mode as the repackaging mode, if the data signal loss rate of the display apparatus 100 is greater than a preset value. In the meantime, if signal loss rate of data processed by the display apparatus 100 is less than a preset value, the display apparatus 100 may determine a processing mode to the bypass mode.

According to an exemplary embodiment, with reference to FIG. 5A, in the case where the first display apparatus 100-1 receives FHD resolution image from the external source device 50 through digital interface such as HDMI and DVI in addition to DP1.2, the first display apparatus 100-1 may determine the repackaging mode to reconstruct signal loss of the image data received from external source device 50 and transmit to the second display apparatus 100-2.

In addition, even when the first display apparatus 100-1 receives various source signals with respect to FHD resolution image from the external source device 50 through various digital interface, the first display apparatus 100 may determine the repackaging mode to output DP1.2 signal having the DPCD and transmit to another display apparatus. Therefore, by processing image data received by the first display apparatus 100-1 from the external source device 50 with the repackaging mode, signal loss of the received data can be reduced, and processing speed of image data can be improved.

The second display apparatus 100-2 may determine the bypass mode which passes through the data processed by the first display apparatus 100-1 to the third display apparatus 100-3 without parsing, to maintain on time to be short. The third display apparatus 100-3 may determine bypass mode which passes through the data processed by the second display apparatus 100-1 to a fourth display apparatus without parsing to maintain on time to be short.

The nth display apparatus 100-n may determine the repackaging mode to reconstruct signal loss of data processed by the n−1 display apparatus to transmit to n+1 display apparatus. From N+1 display apparatus to N−1 apparatus may determine a bypass mode which passes through the input data to another display apparatus without parsing, to maintain one time to be short. Lastly, the Nth display apparatus (100-N) which is a final display apparatus of the video wall can be determined as the bypass mode.

According to an exemplary embodiment, referring to FIG. 5B, when UHD resolution image is input from the external source device 50 through digital interface such as HDMI and DVI in addition to DP1.2, the first display apparatus 100-1 may determine a repackaging mode to reconstruct signal loss of the image data received from the external source device 50 to transmit to the second display apparatus 100-2.

In addition, even when the first display apparatus 100-1 receives various source signals with respect to UHD resolution image from the external source device 50 through various digital interface, the first display apparatus 100 may determine the repackaging mode to output DP1.2 signal having the DPCD and transmit to another display apparatus.

Therefore, by processing image data received by the first display apparatus 100-1 from the external source device 50 with the repackaging mode, signal loss of the received data can be reduced, and processing speed of image data can be improved.

The second display apparatus 100-2 may determine the bypass mode which passes through the data processed by the first display apparatus 100-1 to the third display apparatus 100-3 without parsing, to maintain on time to be short. The third display apparatus 100-3 may determine bypass mode which passes through the data processed by the second display apparatus 100-1 to a fourth display apparatus without parsing to maintain on time to be short.

The nth display apparatus 100-n may determine the repackaging mode to reconstruct signal loss of data processed by the n–1 display apparatus to transmit to n+1 display apparatus. From N+1 display apparatus to N–1 apparatus may determine a bypass mode which passes through the input data to another display apparatus without parsing, to maintain one time to be short. Lastly, the Nth display apparatus (100-N) which is a final display apparatus of the video wall can be determined as the bypass mode.

However, one or more exemplary embodiments illustrated in FIGS. 5A and 5B are merely exemplary. When the first display apparatus 100-1 receives FHD or UHD image from the external source device 50, the first display apparatus 100-1 may determine the repackaging mode, the second display apparatus 100-2 may determine the bypass mode, the third display apparatus 100-3 may determine the bypass mode, and the fourth display apparatus may determine the repackaging mode at a preset position of the display apparatus 100. As such, exemplary embodiments can be implemented with various combinations.

For the exemplary purpose, when the first display apparatus 100-1 receives FHD image from the external source device 50, the repackaging mode can be determined for every nth display apparatus(100-n). For the exemplary purpose, when n is number from 1 to 100, it can be seen that 100 display apparatuses are connected with a video wall. Herein, the position where the repackaging mode is periodically set can be determined as the display apparatus 100-8x which is located at the multiple of 8 such as n=8x (x=1, 2, . . . , 12).

In the meantime, when the first display apparatus 100-1 receives UHD image from the external source device 50, it can be implemented that the repackaging mode is applied for every nth display apparatus (100-n). For the exemplary purpose, if n is number from 1 to 25, it can be said that 25 display apparatuses are connected with a video wall. Here, the arrangement position of a device where the repackaging mode is periodically set can be determined as the display apparatus 100-12x which is at the position of multiple of 12 such as n=12x (x=1, 2).

In addition, according to an exemplary embodiment, the first display apparatus 100-1 may determine a repackaging mode, and the second display apparatus 100-2 may determine the bypass mode or the repackaging mode according to a processing mode determination method based on the signal loss rate.

The above examples are merely exemplary, and based on a preset arrangement position of the display apparatus 100 and signal loss rate of data processed by the display apparatus 100, a processing mode can be implemented by variably combining the bypass mode and the repackaging mode.

Figure 6:
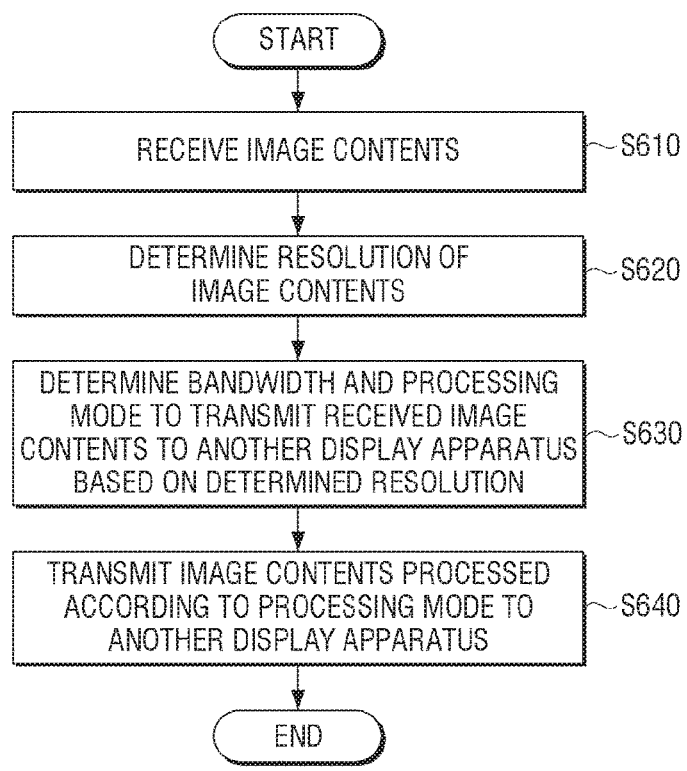
FIG. 6 is a flowchart illustrating a method for operating a processor of the display apparatus according to an exemplary embodiment.

FIG. 6 is a flowchart to describe a method for controlling image input from the external source device 50 by the display apparatus 100.

First of all, the display apparatus 100 determines resolution of image contents (S610) received through the image inputter (S620). The display apparatus 100 may automatically recognize and determine original resolution data (FHD and UHD) of the image contents input from the external source device 50. In addition, the display apparatus 100 determines bandwidth to transmit the received image contents to different display apparatuses 100-1 to 100-8 based on the determined resolution, and determines a processing mode to transmit the received image contents to different display apparatuses 100-1 to 100-8 (S630).

In this case, the processing mode is one of the bypass mode or the repackaging mode. The bypass mode is a mode which passes through the image contents which the first display apparatus 100-1 receives from the external source device 50 to the second display apparatus 100-2 without parsing the image contents. The repackaging mode is a mode to reconstruct the image which the first display apparatus 100-1 receives from the external source device 50 and transmits to the second display apparatus 100-2.

In this case, at the preset arrangement position of the display apparatus 100, the repackaging mode can be determined periodically and lost signal can be reconstructed, to transmit the processed image to the display apparatus 100-1 to 100-8.

In addition, regardless of arrangement of position of a plurality of display apparatuses 100, signal loss rate of the image contents received by the display apparatus 100 from the external source device 50 may be determined, and when signal loss rate of the data processed by the display apparatus 100 is greater than or equal to a preset value, the processing mode in the display apparatus 100 can be determined to be the repackaging mode. In the meantime, the signal loss rate of the data processed by the display apparatus 100 is less than a preset value, the processing mode of the display apparatus 100 can be determined to the bypass mode.

In addition, the display apparatus 100 transmits the image contents processed according to a processing mode determined based on bandwidth determined according to resolution of image input from the external source device 50 to different display apparatuses 100-1 to 100-8 (S640).

Therefore, on a video wall where a plurality of the display apparatuses 100 are composed with a matrix, when high resolution image contents are transmitted to display apparatus 100-1 to 100-8 from the external source device 50, the display apparatus 100 may combine the bypass mode and the repackaging mode and maintain the loop out on time as short as possible, and minimize signal loss as much as possible, so that high resolution image contents can be displayed rapidly on the entire part of the video wall.

Here, loop out on time indicates the time that, on a video wall where a plurality of display apparatuses 100 are connected, after a screen of the first display apparatus 100-1 is turned on and before a screen of the second display apparatus 100-2 is turned on. According to an exemplary embodiment, the processor 120, by combining the processing mode in a variable manner, may shorten time required for all the screen of the first to the last set is turned on in a connected video wall.

Figure 7:
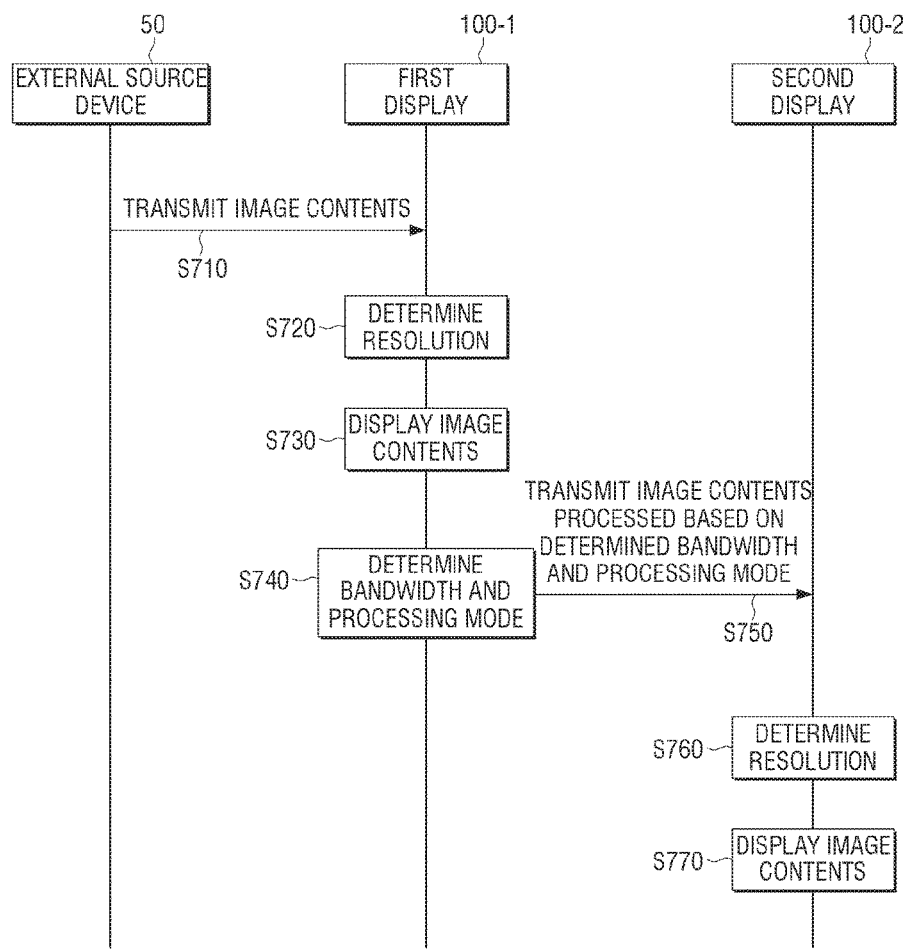
FIG. 7 is a sequence map illustrating a method for controlling display system according to an exemplary embodiment.

FIG. 7 is a sequence map to describe a method for controlling image contents received by the display system 10 from the external source device 50, according to an exemplary embodiment. First of all, the external source device 50 transmits the image contents to the first display apparatus 100-1 (S710). In this case, the first display apparatus 100-1 may be connected to the external source device 50 and the second display apparatus 100-2 using display interface, and transmit the bit rate of the image contents processed through the input (Rx) and output (Tx) terminal of the display interface.

In addition, the first display apparatus 100-1 determines resolution of the image contents received from the external source device 50 (S720) and displays the image contents (S730).

In addition, the first display apparatus 100-1 determines bandwidth to transmit the image processed based on the resolution of the image contents to the second display apparatus 100-2 and determines a processing mode (S740). The processing mode is bypass mode or repackaging mode.

In addition, the first display apparatus 100-1 transmits the image contents processed based on the determined bandwidth to the second display 100-2 (S750).

In addition, the second display apparatus 100-2, based on the image contents processed by the first display apparatus 100-1, determines resolution of the image contents received from the first display apparatus 100-1 (S760). The second display apparatus 100-2 displays the determined resolution (S770). In addition, a method for processing the image contents displayed by the second display apparatus 100-2 has the same process with a method for processing the first display apparatus 100-1.

By the aforementioned display system 10, a video wall connected to a plurality of the display apparatus 100, when high resolution image contents are transmitted to another display from the external source device 50, loop out on time can be maintained as short as possible while minimizing signal loss, and thereby clear image contents can be transmitted and displayed at rapid speed.

In the meantime, the display method according to one or more exemplary embodiments can be implemented as a program and provided to the display apparatus 100 or an input device. In particular, a program including a control method of the display apparatus 100 can be stored in a non-transitory computer readable medium and provided.

The non-transitory recordable medium refers to a medium which may store data semi-permanently rather than storing data for a short time such as a register, a cache, and a memory, and may be readable by an apparatus. For example, the non-transitory readable medium may be CD, DVD, hard disk, Blu-ray disk, USB, memory card, ROM, etc.

The above exemplary embodiments and advantages are merely exemplary and are not to be construed as limiting the present invention. The present disclosure can be readily applied to other types of apparatuses. Also, the description of one or more exemplary embodiments is intended to be illustrative, and not to limit the scope of the claims, and many alternatives, modifications, and variations will be apparent to those skilled in the art.

What is claimed is:

1. A display apparatus, which is one of the plurality of display apparatuses, the display apparatus comprising:
   an interface; and
   a processor configured to:
      receive image contents through the interface;
      identify a bandwidth to transmit the received image contents to another display apparatus among the plurality of display apparatuses based on a resolution of the received image contents;
      identify a processing mode to transmit the received image contents to the other display apparatus based on an arrangement order of the display apparatus in the plurality of display apparatuses; and
      control the interface to transmit, using the identified bandwidth, the received image contents to the other display apparatus according to the identified processing mode,
   wherein the processing mode comprises a bypass mode and a repackaging mode, and
   wherein the processor is further configured to, based on the identified processing mode being the bypass mode, transmit the received image contents to the other display apparatus without parsing the received image contents, and based on the identified processing mode being the repackaging mode, process the received image contents based on a loss rate of the received image contents and transmit the processed image contents.

2. The display apparatus as claimed in claim 1, further comprising:
   an image processor configured to process the received image contents; and
   a display configured to display at least a part of the processed image contents.

3. The display apparatus as claimed in claim 1, wherein the repackaging mode operates in a preset arrangement order of the display apparatus and the other display apparatus.

4. The display apparatus as claimed in claim 1, wherein the processor is further configured to identify a signal loss rate of the received image contents and identify one among the bypass mode and the repackaging mode according to the identified signal loss rate.

5. The display apparatus as claimed in claim 4, wherein the processor is further configured to, in response to the signal loss rate being greater than or equal to a preset value, identify the processing mode as the repackaging mode, and in response to the signal loss rate being less than a preset value, identify the processing mode as the bypass mode.

6. The display apparatus as claimed in claim 1, wherein the processor is further configured to, in response to the resolution of the received image contents being a first resolution, identify the bandwidth as a first bit rate, and in response to the resolution of the received image contents being a second resolution, identify the bandwidth as a second bit rate.

7. The display apparatus as claimed in claim 1, wherein the interface is configured to transmit the received image contents to the other display apparatus, and the interface comprises a receiving terminal and a transmitting terminal.

8. The display apparatus as claimed in claim 1, wherein the plurality of display apparatuses are included in a video wall that displays the received image contents.

9. A method of controlling a display apparatus which is one of a plurality of display apparatuses, the method comprising:
   receiving image contents;
   identifying a bandwidth to transmit the received image contents to another display apparatus among the plurality of display apparatuses based on a resolution of the received image contents, and identifying a processing mode to transmit the received image contents to the other display apparatus based on an arrangement order of the display apparatus in the plurality of display apparatuses; and
   transmitting the received image contents to the other display apparatus using the identified bandwidth according to the identified processing mode,
   wherein the processing mode comprises a bypass mode and a repackaging mode, and wherein the transmitting comprises, based on the identified processing mode being the bypass mode, transmitting the received image contents to the other display apparatus without parsing the received image contents, and based on the identified processing mode being the repackaging mode, processing the received image contents based on a loss rate of the received image contents and transmitting the processed image contents.

10. The method as claimed in claim 9, comprising:
processing the received image contents; and
displaying at least a part of the processed image contents.

11. The method as claimed in claim 9, wherein the repackaging mode operates in a preset arrangement order of the display apparatus and the other display apparatus.

12. The method as claimed in claim 9, further comprising:
identifying a signal loss rate of the received image contents,
wherein the identifying the processing mode comprises identifying one among the bypass mode and the repackaging mode according to the identified signal loss rate of the received image contents.

13. The method as claimed in claim 12, wherein the identifying the processing mode comprises, in response to the signal loss rate being greater than or equal to a preset value, identifying the processing mode as the repackaging mode, and in response to the signal loss rate being less than a preset value, identifying the processing mode as the bypass mode.

14. The method as claimed in claim 9, wherein the identifying the bandwidth comprises, in response to the resolution of the received image contents being a first resolution, identifying the bandwidth as a first bit rate, and in response to the resolution of the received image contents being a second resolution, identifying the bandwidth as a second bit rate.

15. The method as claimed in claim 9, wherein the receiving comprises receiving the image contents through an interface for transmitting the contents to the other display apparatus, and the interface comprises a receiving terminal and a transmitting terminal.

16. The method as claimed in claim 9, wherein the plurality of display apparatuses are included in a video wall that displays the received image contents.

* * * * *